United States Patent [19]

Arai et al.

[11] Patent Number: 5,680,117
[45] Date of Patent: Oct. 21, 1997

[54] COLLISION JUDGING SYSTEM FOR VEHICLE

[75] Inventors: Toshiaki Arai; Yasuhiko Fujita; Akira Sugiyama, all of Wako, Japan

[73] Assignee: Honda Giken Kogyo Kabushiki Kaisha, Tokyo, Japan

[21] Appl. No.: 401,502

[22] Filed: Mar. 10, 1995

[51] Int. Cl.⁶ .................................................. G08G 1/16
[52] U.S. Cl. ........................... 340/903; 340/435; 340/436; 342/455; 364/461; 180/169
[58] Field of Search .................................. 340/403, 435, 340/436; 180/167, 169; 342/455, 41, 29; 364/461

[56] References Cited

U.S. PATENT DOCUMENTS

| | | | |
|---|---|---|---|
| 5,189,619 | 2/1993 | Adachi et al. | 340/903 |
| 5,314,037 | 5/1994 | Shaw et al. | 340/903 |
| 5,420,792 | 5/1995 | Butsuen et al. | 340/903 |
| 5,461,357 | 10/1995 | Yoshioka et al. | 340/903 |

FOREIGN PATENT DOCUMENTS 61-4700  2/1986  Japan .

*Primary Examiner*—Donnie L. Crosland
*Attorney, Agent, or Firm*—Nikaido Marmelstein Murray & Oram LLP

[57] ABSTRACT

A collision judging system for a vehicle includes a sensor for detecting a relative speed between a subject vehicle and an object, and a judging section for judging a possibility of collision of the subject vehicle with the object based on the relative speed. In the collision judging system, when an output from the differentiating device exceeds a preset value, a signal indicative of a command to prohibit the judgment of the possibility of collision in the judging section is outputted from the prohibiting-signal outputting device, thereby avoiding the unnecessary judgment of the possibility of collision in the judging section.

4 Claims, 2 Drawing Sheets

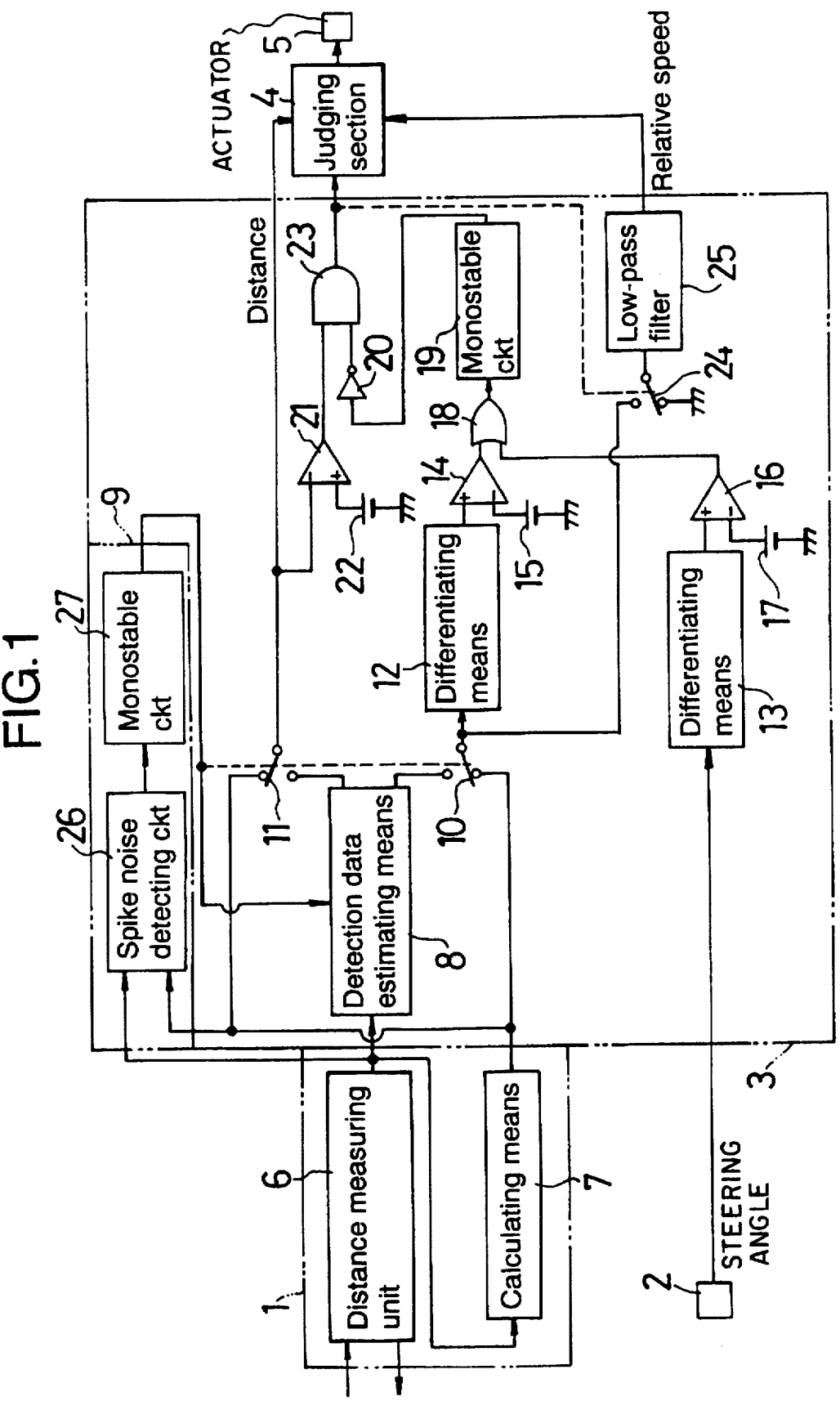

COLLISION JUDGING SYSTEM FOR VEHICLE

BACKGROUND OF THE INVENTION

1. Field of the Invention

The present invention relates to a collision judging system for a vehicle including a sensor for detecting a relative speed between a subject vehicle and an object, and a judging section for judging a possibility of collision based on an output data from the sensor.

2. Description of the Prior Art

There is such a conventionally known collision judging system, as disclosed, for example, in Japanese Patent Publication No.4700/86, in which a distance between the subject vehicle and an object is measured, and a braking distance at a current travel speed of the subject vehicle is calculated, thereby judging a possibility of collision by the comparison of both the distances with each other.

In the above known system, detection data obtained in the sensor is inputted to the judging section after filtering. However, the object which is a subject of judgment of the possibility of collision is not always detected by the sensor, and in some cases, an object such as a guardrail or a standing tree which does not exist on a course of the subject vehicle may be detected, or a noise may be inputted. For this reason, the possibility of collision may be unnecessarily judged in the judging section, and a collision avoiding motion based on a judgment result may be unnecessarily produced, in some cases. Even when a vehicle's driver makes an attempt to avoid the collision of the subject vehicle by a steering operation, while the subject vehicle is approaching a preceding vehicle, it is unnecessary to judge the possibility of the collision.

SUMMARY OF THE INVENTION

Accordingly, it is an object of the present invention to provide a collision judging system for a vehicle, wherein it can be avoided that a possibility of collision is unnecessarily judged in the judging section.

To achieve the above object, according to an aspect and feature of the present invention, there is provided a collision judging system for a vehicle, comprising: a sensor for detecting a relative speed between a subject vehicle and an object; and a judging section for judging a possibility of collision based on the relative speed; wherein the system further includes: a differentiating means for differentiating the relative speed detected by the sensor; and a prohibiting-signal outputting means for outputting a signal indicative of a command to prohibit the judgment of the possibility of collision in the judging section, when an output from the differentiating means exceeds a preset value.

With such arrangement, when the output from the differentiating means for differentiating the relative speed detected by the sensor exceeds the preset value, the signal indicative of a command to prohibit the judgment of the possibility of collision in the judging section is outputted from the prohibiting-signal outputting means, thereby avoiding the unnecessary judgment of the possibility of collision based on the detection of a standing tree, a guardrail or the like.

According to another aspect and feature of the present invention, the sensor includes a distance measuring unit for measuring a distance between the subject vehicle and the object, and a calculating means for differentiating distance data delivered from the distance measuring unit to provide a relative speed, and the collision judging system further includes a data processing section having the differentiating means and the prohibiting-signal outputting means and interposed between the sensor and the judging section, the data processing section including a detection data estimating means for estimating a current value of the relative speed based on the past distance data delivered from the distance measuring unit, a change-over signal outputting means for outputting a change-over signal, when the distance data delivered from the distance measuring unit or the relative speed delivered from the calculating means is suddenly varied, and a detection data change-over means for changing the relative speed to a value estimated by the detection data estimating means to supply the value to the differentiating means in response to the delivery of the change-over signal from the change-over signal outputting means.

With this feature, the current value of the relative speed is estimated in the detection data estimating means based on the past distance data obtained in the sensor, and when the distance data or the relative speed obtained on the sensor is suddenly varied, the relative speed is changed to the value estimated by the detection data estimating means in response to the delivery of the change-over signal from the change-over signal outputting means. Thus, it is possible to continue the judgment of the possibility of collision using the estimating distance and the estimating relative speed, while avoiding the frequent generation of the collision judgment prohibiting signal caused by the single incorporation of a noise, thereby dealing with an abnormality of true detection data.

According to a further aspect and feature of the present invention, there is provided a collision judging system for a vehicle, comprising a sensor for detecting a relative motion parameter between a subject vehicle and an object, and a judging section for judging a possibility of collision based on the detection data detected by the sensor, wherein the collision judging system further includes a steering angle detector for detecting a steering angle, a differentiating means for differentiating the detection value detected by the steering angle detector, and a prohibiting-signal outputting means for outputting a signal indicative of a command to prohibit the judgment of the possibility of collision in the judging section, when an output from the differentiating means exceeds a preset value.

With such arrangement, when the output from the differentiating means exceeds the preset value, the signal indicative of a command to prohibit the judgment of the possibility of collision in the judging section is outputted from the prohibiting-signal outputting means. Thus, when the reliability of the detection by the sensor is significantly reduced due to the collision avoiding motion of the vehicle, it is avoided that the judgment of the possibility of collision is unnecessarily carried out.

Further, according to another aspect and feature of the present invention, the collision judging system further includes a detection data changing means for forcibly changing the detection data to "0", when the prohibiting signal is outputted from the prohibiting-signal outputting means. Thus, it is possible to more reliably carry out the processing of the data in the judging section, when the prohibiting signal is inputted to the judging section.

The above and other objects, features and advantages of the invention will become apparent from the following description of a preferred embodiment taken in conjunction with the accompanying drawings.

BRIEF DESCRIPTION OF THE DRAWINGS

FIG. 1 is a block diagram illustrating the entire arrangement of a collision judging system according to the present invention;

DESCRIPTION OF THE PREFERRED EMBODIMENTS

Figure 2A:
FIGS. 2A and 2B are diagrams illustrating the timing of input and output of a reset-type monostable circuit.

The present invention will now be described by way of a preferred embodiment in connection with the accompanying drawings.

Referring first to FIG. 1, a sensor 1 is mounted at a front portion of a vehicle (not shown) for detecting a distance between the subject vehicle and an object, and a relative speed determined by a differentiation of the distance as relative motion parameters between the subject vehicle and the object. A steering angle detector 2 for detecting a steering angle is mounted to a steering device which is not shown. Detection signals detected by the sensor 1 and the steering angle detector 2 are inputted to a dada processing section 3. In the dada processing section 3, the detection data detected by the sensor 1 are processed based on the detection signals from the sensor 1 and the steering angle detector 2, and processed signals are inputted to a judging section 4. The judging section 4 judges a possibility of a collision between the subject vehicle and the object based on the relative motion parameters (i.e., the distance and the relative speed) received from the data processing section 3. As a result, if it is decided by the judging section that the possibility of the collision is high, an actuator 5 such as a brake and an alarm is operated in response to a control signal from the judging section 4. Moreover, if it is decided that the sensor 1 has detected an object which is a subject for judging detection of the possibility of the collision, i.e., an object other than a vehicle traveling ahead of the subject vehicle, e.g., a guardrail, a standing tree or the like, if it is decided that there is a noise mixed in a signal, or if it is decided that a vehicle's driver is performing a steering operation for avoiding a collision, a prohibiting signal is supplied from the data processing section 3 to the judging section 4. Upon the reception of the prohibiting signal, the judging section 4 stops the judgment of the possibility of the collision.

The sensor 1 includes a distance measuring unit 6 for measuring a distance between the subject vehicle and an object by emitting laser beams from a laser diode and receiving beams reflected from the object, and a calculating means 7 for differentiating the distance dada supplied from the distance measuring unit 6 to provide a relative speed. The distance between the subject vehicle and the object determined by the distance measuring unit 6, as well as the relative speed determined by the calculating means 7 are supplied to the data processing section 3.

The data processing section 3 includes: a detection data estimating means 8 for estimating current values of the distance and the relative speed between the subject vehicle and the object based on the past distance supplied from the distance measuring unit 6; a change-over signal outputting means 9 for outputting a change-over signal, when the distance supplied from the distance measuring unit 6 or the relative speed supplied from the calculating means 7 is suddenly changed; and first and second detection data change-over means 10 and 11 for changing the distance and the relative speed to values estimated by the detection data estimating means 8 in response to the delivery of the change-over signal from the change-over signal outputting means 9. The data processing section 3 further includes: a first differentiating means 12 for differentiating an output from the first detection data change-over means 10, a second differentiating means 13 for differentiating the detection value from the steering angle detector 2; a first comparator 14 serving as a first prohibiting signal outputting means for outputting a prohibiting signal when an output from the first differentiating means 12 exceeds a first preset value; a second comparator 16 serving as a second prohibiting signal outputting means for outputting a prohibiting signal when an output from the second differentiating means 13 exceeds a second preset value; an OR gate 18 to which output signals from the comparators 14 and 16 are inputted in parallel; a monostable circuit 19 to which an output signal from the OR gate 18 is inputted; an inverter 20 for inverting an output from the monostable circuit 19; and a third comparator 21 which delivers a high level signal when output from the second detection data change-over means 11 is smaller than a third preset value. Yet further, the data processing section 3 includes: an AND gate 23 to which output signals from the inverter 20 and the third comparator 21 are inputted in parallel; a detection data changing means 24 which switches between a state in which it permits the output from the first detection data changing means 11 to be delivered as it is, in response to an output from the AND gate 23, and a grounded state; and a low-pass filter 25 to which an output from the detection data changing means 24 is inputted. Thus, the distance data is supplied from the second detection data change-over means 11 to the judging section 4, and the relative speed data is supplied from the low-pass filter 25 to the judging section 4. The prohibiting signal, which becomes a low level, is supplied from the AND gate 23 to the judging section 4 when the judgement of the possibility of the collision by the judging section 4 is prohibited.

The detection data estimating means 8 estimates a distance and a relative speed which would have been detected by a current sampling by applying a straight line provided by a least squares approximation, based on up to three past distance data received from the distance measuring unit 6 of the sensor 1. The distance is determined as a point which is extended on the straight line during one sampling time, and the relative speed is determined from an inclination of the straight line. The reason why up to three past distance data are used is that three data may not be obtained if the distance measuring unit 6 does not receive reflected beam.

The control signal is inputted from the change-over signal outputting means 9 to the detection data estimating means 8. If the control signal is of a high level, the detection data estimating means 8 delivers the distance and relative speed estimated this time. If the control signal is of a low level, the detection data estimating means 8 stores the distance data inputted this time from the distance measuring unit 6 in a memory for a next estimation.

The change-over signal outputting means 9 includes a spike noise detecting circuit 26, and a reset-type monostable circuit 27 connected to the spike noise detecting circuit 26. Both of the distance data determined in the distance measuring unit 6 of the sensor 1 and the relative speed data determined in the calculating means 7 are inputted to the spike noise detecting circuit 26. The spike noise detecting circuit 26 delivers a high level signal on the assumption that a spike noise was mixed when the distance data or the relative speed data is suddenly varied. When the amount of distance varied exceeds, for example, 250 km/hr on the assumption that the vehicle rams into a stop matter during traveling at a high speed, or when the amount of relative speed varied, i.e., the relative acceleration exceeds ±1 G on the assumption that the full brake was applied, the high level signal is outputted from the spike noise detecting circuit 26.

Figure 2B:
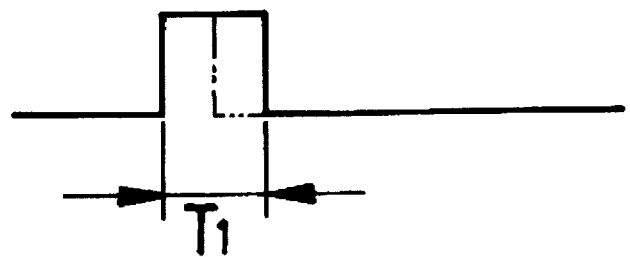

The reset-type monostable circuit 27 is triggered as shown in FIG. 2B to deliver a high level change-over signal sustained for a preset time $T_1$, when the output from the spike noise detecting circuit 26 is risen, as shown in FIG. 2A, based on the decision of the fact that the spike noise has been detected. When the output from the spike noise detecting circuit 26 has been changed to a low level within the preset time $T_1$, as shown by a dashed line in FIG. 2A, the monostable circuit 27 is also reset, and hence, the output from the monostable circuit 27 is also changed immediately to a low level as shown by a dashed line in FIG. 2B.

The sensor 1 delivers an average data of 100 times measurements at every interval of sampling time of 0.1 seconds. For the reason that when a burst error of the data is generated at a time near the sampling, there is a possibility that an error is included in data provided by two runs of sampling, the preset time $T_1$ is set, for example, at 0.3 seconds, so that the interpolation for the data provided by at largest three runs of sampling can be performed in the detection data estimating means 8.

The first detection data change-over means 10 is a switch circuit which is switchable between a state in which it selects and delivers a relative speed determined in the calculating means 7 of the sensor 1, when the output from the change-over signal outputting means 9, i.e., the output from the reset-type monostable circuit 27 is of a low level, and a state in which it selects and delivers an estimated relative speed determined in the detection data estimating means 8 in response to the output from the reset-type monostable circuit 27 rising to a high level. The second detection data change-over means 11 is a switch circuit which is switchable between a state in which it selects and delivers a distance determined in the distance measuring unit 6 of the sensor 1, when the output from the reset-type monostable circuit 27 is of a low level, and a state in which it selects and delivers an estimated distance determined in the detection data estimating means 8 in response to the output from the reset-type monostable circuit 27 rising to a high level.

The detected relative speed or the estimated relative speed selected by the first detection data change-over means 10 in response to the output from the change-over signal outputting means 9 is differentiated in the first differentiating means 12. An output from the first differentiating means 12 is inputted to a non-inverted input terminal of the first comparator 14. And a signal corresponding to a first preset value, e.g., ±20 km/hr per a predetermined sampling time (0.1 seconds) is inputted to an inverted input terminal of the first comparator 14 from a first reference power supply 15. Thus, the first comparator 14 delivers a high level signal, when the amount of relative speed varied exceeds the first preset value.

A steering angle determined in the steering angle detector 2 is differentiated in the second differentiating means 13, and an output from the second differentiating means 13 is inputted to a non-inverted input terminal of the second comparator 16. A signal corresponding to a steering angle of a second preset value, e.g., ±10 degree per a predetermined sampling time (0.1 seconds) is inputted to an inverted input terminal of the second comparator 16 from a second reference power supply 17. Thus, the second comparator 16 delivers a high level signal, when the amount of steering angle varied exceeds the second preset value.

A high level signal is outputted from the OR gate 18 to which the outputs from the first and second comparators 14 and 16 are inputted in parallel, in at least one of a state in which the first comparator 14 delivers the prohibiting signal based on the amount of relative speed varied and a state in which the second comparator 16 delivers the prohibiting signal based on the amount of steering angle varied.

Figure 3A:
FIGS. 3A and 3B are diagrams illustrating the timing of input and output of a monostable circuit.
Figure 3B:
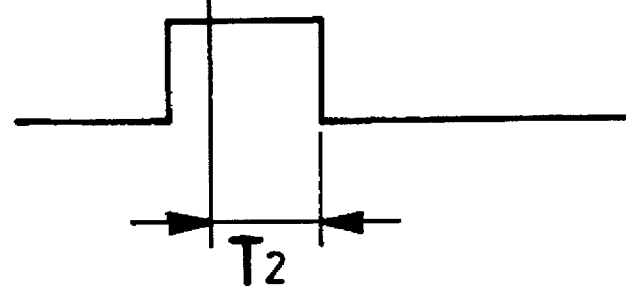

The monostable circuit 19, to which the output signal from the OR gate 18 is inputted, continuously delivers a signal which becomes high in response to the rising as shown in FIG. 3A, and which is maintained high until a preset time $T_2$ is lapsed from the falling of the output signal from the OR gate 18. The preset time $T_2$ is set, for example, at 0.5 seconds. The monostable circuit 19 functions to delay the releasing of the delivery of the prohibiting signal, until each of the data is sufficiently stabilized after delivery of the prohibiting signal, and functions to continuously retain a high level prohibiting signal, when it has been generated frequently at an interval of time shorter than the preset time $T_2$ from the OR gate 18 due to the incorporation of a noise.

The output from the second detection data change-over means 11 is inputted to an inverted input terminal of the third comparator 21, and a signal corresponding to a distance of a third preset value, e.g., 255 m is inputted to a non-inverted input terminal of the third comparator 21 from a third reference power supply 22. Thus, the third comparator 21 delivers a high level signal, when the distance detected by the sensor 1 or the distance estimated in the detection data estimating means 8 is smaller than the third preset value. The distance of 255 m is set as a distance non-detectable by the distance measuring unit 6 of the sensor 1. The third comparator 21 delivers the high level signal in a state in which an object exists at a distance smaller than a detectable distance.

The output from the monostable circuit 19 is inverted in the inverter 20 and inputted to the AND gate 23, and the output from the third comparator 21 is also inputted to the AND gate 23. Thus, the AND gate 23 delivers a low level prohibiting signal, when the high level signal is outputted from the monostable circuit 19 in response to the output from the OR gate 18 becoming a high level, or when the low level signal is outputted from the third comparator 21 based on the decision of the fact that no object exists within a detectable distance.

The detection data changing means 24 is a switch circuit which is switchable between a state in which an output terminal of the switch circuit is grounded, when the output from the AND gate 23 is of a low level, and a state in which it permits an output from the first detection data change-over means 11 to be delivered as it is, when the output from the AND gate 23 is of a high level. When the output from the AND gate 23 is of a low level, i.e., when the prohibiting signal indicative of a command to prohibit the judgment in the judging section 4 is inputted to the detection data changing means 24, the latter forcibly changes the relative speed to "0" (zero).

The output from the detection data changing means 24 is inputted to the judging section 4, after cutting of a noise by the low-pass filter 25 having a cut-off frequency set, for example, at 1 Hz.

The operation of this embodiment will be described below. In judging the possibility of collision in the judging section 4, when the value of the relative speed resulting from the differentiation in the first differentiating means 12 exceeds, for example, ±20 km/hr per 0.1 seconds, it is decided that a standing tree or guardrail which does not exist on a course of the subject vehicle has been detected, and the low level prohibiting signal is supplied to the judging section 4, so that the judgment of the possibility of collision is not carried out in the judging section 4. Therefore, the operation of the actuator 5 based on the unnecessary judgment of the possibility of collision is avoided.

When the value of the steering angle resulting from the differentiation in the second differentiating means 14 exceeds, for example, ±10 degree per 0.1 seconds, it is decided that the driver is steering so as to avoid the collision of the vehicle, and the low level signal is supplied to the judging section 4, so that the judgment of the possibility of collision is not carried out in the judging section 4. Therefore, when the reliability of the detection by the sensor 1 is significantly reduced due to the motion for avoiding the collision of the vehicle, the unnecessary judgment of the possibility of collision is avoided.

Moreover, when the distance data obtained in the distance measuring unit 6 or the relative speed data obtained in the calculating means 7 is suddenly varied, a high level signal is outputted from the change-over signal outputting means 9 based on the decision of the fact that a spike noise has been incorporated. In this case, the distance and the relative speed estimated in the detection data estimating means 8 are selected in the first and second data change-over means 10 and 11 and therefore, the judgment of the possibility of collision can be continued using the estimated distance and the estimated relative speed, while avoiding the frequent generation of the collision judgment prohibiting signal caused by the incorporation of the spike noise, thereby dealing with an abnormality of true detection data.

Further, when the judgment of the possibility of collision is prohibited in the judging section 4, the relative speed is forcibly changed to "0" by the detection data changing means 24 and therefore, it is possible to reliably carry out the processing of data in the judging section 4, when the prohibiting signal is inputted to the judging section 4.

Although the embodiment of the present invention has been described in detail, it will be understood that the present invention is not limited to the above-described embodiment, and various modifications may be made without departing from the spirit and scope of the invention defined in claims.

What is claimed is:

1. A collision judging system for a vehicle, comprising: a sensor for detecting a relative speed between a subject vehicle and an object; and a judging section for judging a possibility of collision based on said relative speed; wherein said system further includes:

a differentiating means for differentiating the relative speed detected by said sensor; and a prohibiting-signal outputting means for outputting a signal indicative of a command to prohibit the judgment of the possibility of collision in said judging section, when an output from said differentiating means exceeds a preset value.

2. A collision judging system for a vehicle according to claim 1, wherein said sensor includes a distance measuring unit for measuring a distance between the subject vehicle and the object, and a calculating means for differentiating distance data delivered from said distance measuring unit to provide the relative speed, and said collision judging system further includes a data processing section having said differentiating means and said prohibiting-signal outputting means and interposed between said sensor and said judging section, said data processing section including: a detection data estimating means for estimating a current value of said relative speed based on a past distance data delivered from said distance measuring unit; a change-over signal outputting means for outputting a change-over signal, when the distance data delivered from said distance measuring unit or the relative speed delivered from said calculating means is suddenly varied; and a detection data change-over means for changing the relative speed to a value estimated by said detection data estimating means to supply said value to said differentiating means in response to the output of the change-over signal from said change-over signal outputting means.

3. A collision judging system for a vehicle, comprising a sensor for detecting a relative motion parameter between a subject vehicle and an object, and a judging section for judging a possibility of collision based on the detection data detected by said sensor, wherein said collision judging system further includes:

a steering angle detector for detecting a steering angle;

a differentiating means for differentiating the detection value detected by said steering angle detector; and a prohibiting-signal outputting means for outputting a signal indicative of a command to prohibit the judgment of the possibility of collision in said judging section, when an output from said differentiating means exceeds a preset value.

4. A collision judging system for a vehicle according to claim 1, 2 or 3, further including a detection data changing means for forcibly changing the detection data to "0", when the prohibiting signal is outputted from said prohibiting-signal outputting means.

* * * * *